Figure 1:
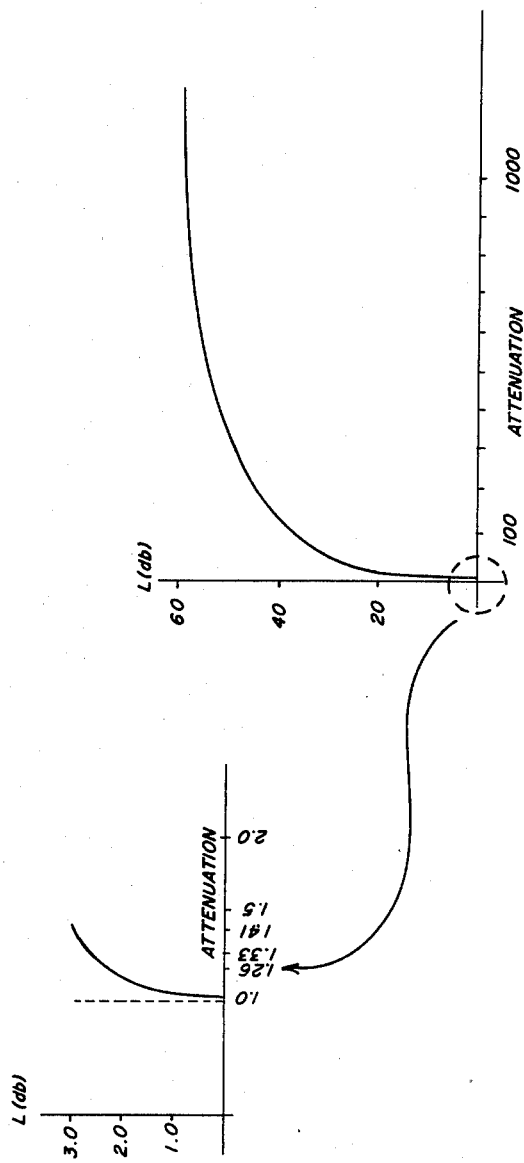

United States Patent [19]

Browder

[11] 4,387,408
[45] Jun. 7, 1983

[54] MULTI-SPEED MAGNETIC RECORDER WITH WEAR RESISTANCE PLAYBACK HEAD

[75] Inventor: Lewis B. Browder, Altadena, Calif.

[73] Assignee: Eastman Kodak Company, Rochester, N.Y.

[21] Appl. No.: 193,773

[22] Filed: Oct. 3, 1980

[51] Int. Cl.³ .......................... G11B 5/60; G11B 5/22
[52] U.S. Cl. ...................................... 360/103; 360/62; 360/122
[58] Field of Search .................... 360/103, 104, 62–63, 360/73, 75, 102, 15, 122, 8

[56] References Cited

U.S. PATENT DOCUMENTS

| | | |
|---|---|---|
| 3,323,116 | 5/1967 | Solyst . |
| 3,525,987 | 8/1970 | Muijderman ........................ 360/103 |
| 3,582,917 | 6/1971 | Hertrich et al. .................... 360/102 |
| 3,614,579 | 10/1971 | Fulton .................................. 360/75 |
| 3,678,482 | 7/1972 | Billawala . |
| 3,732,552 | 5/1973 | Walraven ............................ 360/75 |
| 3,813,687 | 5/1974 | Geil ........................................ 360/8 |
| 3,821,813 | 6/1974 | Freeman et al. . |
| 4,086,635 | 4/1978 | Saitou .................................. 360/62 |
| 4,146,911 | 3/1979 | Gyi et al. ............................ 360/75 |

FOREIGN PATENT DOCUMENTS 723819 12/1965 Canada ............................... 360/102

OTHER PUBLICATIONS

"Television and Lunar Exploration", S. W. Spaulding, Journal of the SMPTE, vol. 69, Jan. 1960, p. 39.
"Experimental & Theoretical Investigation of Head to Tape Separation in Magnetic Recordings", IEEE Transactions on Magnetics, vol. MAG-9, No. 4, Dec. 1973, pp. 683–688.

*Primary Examiner*—Alfred H. Eddleman
*Attorney, Agent, or Firm*—Robert F. Cody

[57] ABSTRACT

A magnetic tape recorder of the type wherein tape is transported at high speed during recording and at low speed during playback is described. The recorder has separate record and playback heads. To prevent the shallow-gapped playback head from being worn out by, and during, the high speed recording operation, the playback head is disposed to fly the tape at an appreciable distance from the playback head. During low speed playback of the tape, however, tape flight vis-a-vis the playback head is desirably miniscule.

5 Claims, 3 Drawing Figures

MULTI-SPEED MAGNETIC RECORDER WITH WEAR RESISTANCE PLAYBACK HEAD

BACKGROUND OF THE INVENTION

1. Field of the Invention

This invention relates in general to magnetic recording and, in particular, to playback heads useful with magnetic recorders which record at one recording medium-to-head speed and play back at another.

2. Description Relative to the Prior Art

There are many instances in the art of magnetic recording where a recording medium such as a magnetic tape is transported during recording at a first high speed and, during playback, at a second, much lower, speed. See, for example, "Television and Lunar Exploration", by S. W. Spaulding, Journal of the SMPTE, Vol. 69, January 1960, pg. 39.

As a part of their design, playback heads ordinarily have transducer gaps which are extremely shallow. Attendantly, it is highly desirable that a playback head not abrade against a recording tape while a separate record head effects high speed recording of the tape. Aside from causing the playback transducer gap to vanish gradually, high speed playback head-to-tape contact causes the radius of curvature of the tape contacting surface of the head to increase as well, thereby further accelerating the consumption of the playback transducer gap. (By contrast, record heads have deep gaps and, as a result, are not as susceptible to gap-related problems. Besides, as is known, head efficiency in a record head increases with a decreasing gap depth.)

Certainly, the straight-forward solution to the problem of playback head wear in a recorder employing high speed recording and low speed playback is to provide articulation of the playback head: while high speed recording with a record head, the playback head is moved out of contact with the tape, thereby to prevent the playback head from being worn out; during low speed playback, however, the playback head is moved back into contact with the tape for playback purposes. To articulate the playback head requires fairly precise linkages since such linkages must set the playback head against the recorded tape track, or tracks, during playback. Precision parts mean added expense and, naturally, are to be avoided where possible.

It is well known that the signal loss in decibels during playback of a recorded tape is approximately equal to 55 (h/$\lambda$), where h is the separation between the playback head and the tape, and $\lambda$ is the wavelength of the recorded signal. Complementing this relationship is the fact that the head-to-tape separation h equals $$0.643\, r_o \left(\frac{6\mu u}{T}\right)^{\frac{2}{3}}$$

where
- $r_o$ = the radius of curvature of the tape contacting surface of the playback head
- $\mu$ = viscosity of air (typically $0.265 \times 10^{-8}$ pounds seconds per square inch)
- u = tape speed (inchs/sec.)
- T = tape tension (lbs./in.).

These two relationships, which are both discussed in a paper, "Experimental and Theoretical Investigation of Head to Tape Separation in Magnetic Recordings", IEEE Transactions on Magnetics, Vol. MAG-9, No. 4, December 1973, pages 683–688, are employed to advantage in providing, in a recorder of the type having differing record and playback speeds, an inarticulated wear-free playback head.

The above noted IEEE paper, as well as the following art, may be of interest as background for the present invention: U.S. Pat. No. 3,323,116; U.S. Pat. No. 3,525,987; U.S. Pat. No. 3,678,482; and U.S. Pat. No. 3,821,813.

SUMMARY OF THE INVENTION

Figure 3:
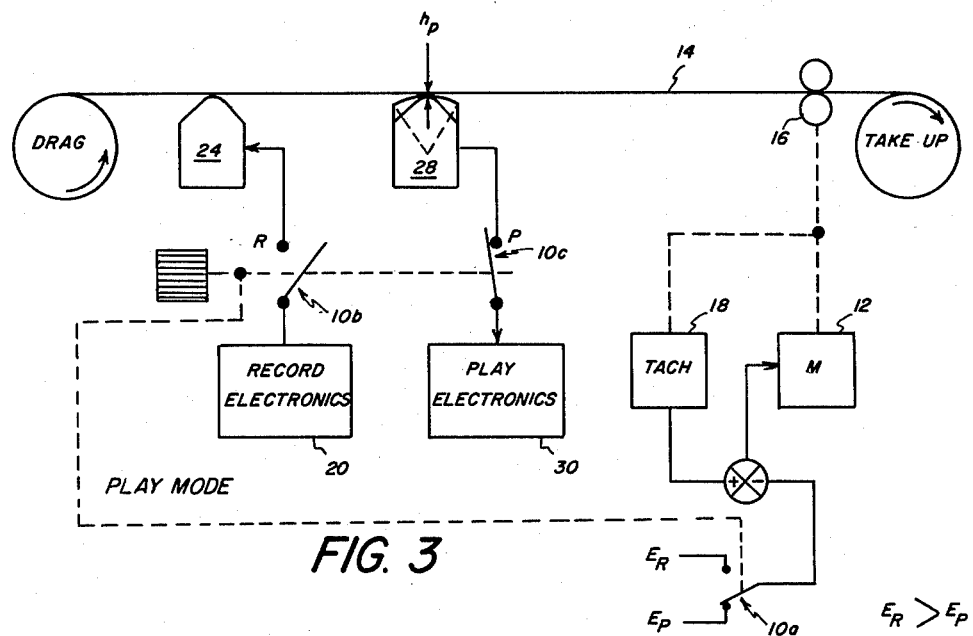

Recognizing the logarithmic nature of the playback process with regard to the matter of head-to-tape separation, the concept of the present invention is to "fly" a tape at a first relatively large distance away from a playback head while high speed recording such tape and, during low speed playback thereof, to "fly" the tape at a second distance which is sufficiently small that the playback losses are negligible. How and why a tape will "fly" as required will be discussed below with reference to the figures, of which FIG. 1 is a diagram useful in illustrating the logarithmic relationship that exists between separation loss and the corresponding signal attenuation, FIG. 2 is a block diagram illustrating a recording apparatus having inarticulated record and playback heads, and which apparatus is depicted in its record mode of operation, and FIG. 3 is a block diagram illustrating the recording apparatus of FIG. 2 in its playback mode of operation.

Figure 2:
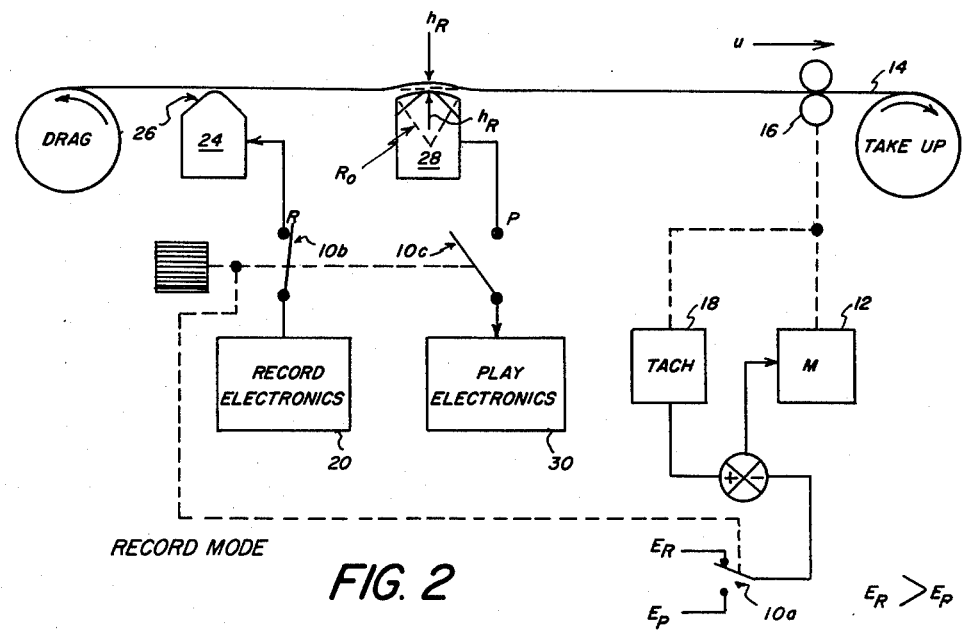

Referring to FIG. 1, a plot depicting the relationship between various decibel levels and corresponding levels of attenuation shows the relationship to be logarithmic in nature. That is, since the number of decibels associated with an attenuation ratio of recorded and playback signals $e_R$ and $e_P$, respectively, equals $\log_{10} e_R/e_P$, zero db means an $e_R$ to $e_P$ attenuation ratio of 1; 20 db means an $e_R$ to $e_P$ attenuation ratio of 10; 40 db means an $e_R$ to $e_P$ attenuation ratio of 100; 60 db means an $e_R$ to $e_P$ attenuation ratio of 1,000, and so on, with appropriate other $e_R$ to $e_P$ attenuation ratio values occurring between such specifically identified decibel levels. It is interesting to note that for decibel levels from below 3 (and especially from below 2.5) the attenuation ratio barely decreases from 1.5 (or 1.33) to one, whereas if the decibel level changes from, say, 60 to 57 the attenuation ratio changes significantly i.e. from 1,000 to about 317, a difference of almost 700. Such being the case, the concept of the invention is to fly tape, during playback thereof, so that the loss in decibels due to the spacing loss is less than about 2.5 to 3 and, when high speed recording such tape, the tape is caused to fly so that the head-to-tape spacing is significantly greater than that which occurs during playback.

In light of the above statement concerning the concept of the invention, consideration should now be given to the spacing loss (L) equation cast in terms of the head-to-tape separation h, i.e.

$$h = \frac{L\lambda}{55}.$$

Assuming a typical recorded wavelength of $80\mu''$ ($\mu''$ = microinch), the head-to-tape separation $h_P$ for a playback loss of, say, 2.5 decibels would be $$h_P = \frac{2.5 \times 80}{55} = 3.63\mu'',$$

a situation where the tape is practically in contact with the playback head. Now, having identified a tolerable head-to-tape separation of about $3.63\mu''$ for the example in question, the radius of curvature $r_o$ for the face of the playback head which will effect such head-to-tape separation, at a playback tape speed of, for example, 6 inches per second (ips), and under a tape tension T of, for example, 0.5 pounds/inch, may be determined from the second of the two relationships discussed under Description Relative to the Prior Art. Thus, $$r_o = \frac{L\lambda}{55 \times 0.643} \left(\frac{T}{6\mu u}\right)^{\frac{3}{2}}$$

$$r_o = \frac{2.5 \times 80 \times 10^{-6}}{55 \times 0.643} \left(\frac{0.5}{6 \times 0.265 \times 10^{-8} \times 6}\right)^{\frac{3}{2}}$$

$$r_o = 0.17 \text{ inches}.$$

With a head having a facial radius of curvature of 0.17 inches, it is interesting to determine the degree of tape flight that occurs when, without doing anything else, the tape speed is increased, as in high speed recording, to say 180 ips. In such a case, the head-to-tape separation $h_R$ becomes $$h_R = 0.643 \, r_o \left(\frac{6\mu u}{T}\right)^{\frac{3}{2}}$$

$$h_R = 0.643 \times 0.17 \left(\frac{6 \times 0.265 \times 10^{-8} \times 180}{0.5}\right)^{\frac{3}{2}}$$

$$h_R = 31.3\mu''.$$

Thus, by the judicious selection of a radius of curvature for the face of a playback head, that head may provide efficient playback of recorded signals from a magnetic tape depending on whether the tape is run at less than a certain speed. When run at high recording speeds, however, the tape lifts itself above the playback head, thereby preventing undesired playback head abrasion by the fast moving tape.

Turning now to FIGS. 2, 3, a magnetic tape recorder of the type having high speed recording, and low speed playback, is shown. In the recording mode of FIG. 2, a switch 10a is set to apply a voltage $E_R$ to a capstan motor 12. The capstan motor 12 advances tape 14, via a capstan 16, at a first high speed (e.g. 180 ips) as determined by the voltage $E_R$. A tachometer 18, driven by the motor 12, produces a feedback signal for servoing the motor 12 to drive the tape precisely at the desired recording speed. As the tape 14 advances, signals supplied by electronics 20 are applied via a switch 10b to a record head 24. The record head 24 is conventional; has a deep gap; and is, therefore, relatively immune to abrasion caused by the fast passage of tape over its surface 26.

The playback head 28, having a facial radius of curvature $r_o$, as determined above, is situated downstream of the record head 24 (but could, if preferred, be upstream of the record head 24); and, because of its facial radius of curvature, high speed passage of the tape 14 vis-a-vis the playback head 28 causes air to be entrained by the tape motion, whereby the tape lifts ($h_R$) out of abrading-contact with the delicate playback head.

During playback (FIG. 3), a switch 10c is closed; the switch 10b is opened; and the switch 10a is set to apply a relatively low voltage $E_P$ to the capstan motor 12, the voltage $E_P$ being that voltage which will cause the motor 12 to drive the tape 14 at the desired playback speed of, for example, 6 ips. As the tape 14 moves at slow speed, it barely flies . . . the minimal head-to-tape separation of $h_P$ being virtually ineffectual to prevent good playback, via electronics 30, of recorded signals.

It will be appreciated, from the foregoing discussion, that the invention provides, in a magnetic recorder having high speed recording and low speed playback, that the playback head has facial contouring which will prevent the playback head from being in extremely close contact with the recording medium unless the medium-to-head speed is relatively small. Various other aspects of the invention are worthy of note: the playback head-to-tape separation during playback is, preferably, about one-twentieth the shortest recorded wavelength; the playback head-to-tape separation $h_R$ during the recording process is, preferably, about one-half the shortest recorded wavelength; and the ratio of $h_R/h_P$ is, preferably, about 10.

The invention has been described in detail with particular reference to preferred embodiments thereof, but it will be understood that variations and modifications can be effected within the spirit and scope of the invention. For example, while the above description speaks of tape (14) flight, it will be appreciated that, instead of tape flight vis-a-vis the head, the invention may be practiced by means of head flight vis-a-vis the tape. Also, while discussed in relation to "magnetic tape", it will be appreciated that the invention may be adapted to various configurations of magnetic disc recording. And,-while no reference has been made to the nature of the signals processed by the apparatus of FIGS. 2, 3, such signals may take any form such as audio, video, and digital signals. Further, it will be appreciated that, if the playback head-to-medium speeds for recording and playback were to change, as in other embodiments, the facial radius of curvature of the playback head would change accordingly.

What is claimed is:

1. Apparatus for recording signals on and playing back signals from a magnetic tape, said apparatus
    (a) being adapted to transport tape, during signal recording, at a first relatively high tape speed and, during signal playback, at a second relatively low tape speed, and
    (b) having separate stationary record and playback heads, said playback head being provided with a tape contacting surface that has a constant radius of curvature such that relative head-to-tape flight occurs between said playback head and said tape which is greater during signal recording than during signal playback, said radius of curvature being such that said head-to-tape flight is, during signal playback, about one-twentieth the shortest recorded wavelength to be played back and, during signal recording, said head-to-tape flight is about ten times that amount.

2. The apparatus of claim 1 wherein said radius of curvature is further defined as being approximately equal to $$\frac{L\lambda}{55 \times 0.643} \left(\frac{T}{6\mu u}\right)^{\frac{2}{3}}$$

where
- L is a number of decibels less than about 3,
- λ is the shortest recorded wavelength, in inches, to be played back,
- T is the tension of said tape in pounds per inch,
- u is said second relatively low playback tape speed in inches per second, and
- μ is the viscosity of air in pounds seconds per square inch.

3. The apparatus of claim 1 wherein
 (a) said first relatively high tape speed is about 180 inches per second.
 (b) said second relatively low tape speed is about 6 inches per second,
 (c) the tension in said tape, during said second relatively low playback speed is about 0.5 pounds per inch, and
 (d) the radius of curvature of the tape contacting surface of said playback head is approximately 0.17 inches.

4. In magnetic recording apparatus comprising
 (a) a record head,
 (b) a playback head adapted to reproduce signals recorded by means of said record head, and
 (c) means for transporting a recording medium relative to said record and playback heads, said means for transporting being adapted to transport said medium at either a first high speed or a second low speed, the improvement wherein said playback head has a medium contacting surface which is such that said medium flies relative to said playback head by a substantial amount when said medium is transported at said first speed and by an insignificant amount when said medium is transported at said second speed, whereby high speed abrading-contact between said playback head and said medium is prevented, and wherein said playback head has a generally arcuate medium-contacting surface having a radius of curvature such that, while transporting said medium at said first high speed, the displacement between said medium and said playback head is about one-half the shortest wavelength recorded by said record head in said medium and, while transporting said medium at said second low speed, said displacement is about one-twentieth the shortest wavelength recorded by said record head in said medium.

5. Apparatus for recording signals on a magnetic tape, said apparatus
 (a) being adapted to transport tape, during a first operative period, at a first relatively high tape speed and, during a second operative period, at a second relatively low tape speed, and
 (b) having a stationary magnetic head that is provided with a tape contacting surface that has a constant radius of curvature such that relative head-to-tape flight occurs between said head and said tape which is greater during said first operative period than during said second operative period,
said radius of curvature being such that said head-to-tape flight is, during said second operative period, about one-twentieth the shortest wavelength to be processed by said head and, during said first operative period, said head-to-tape flight is about ten times that amount.

* * * * *

UNITED STATES PATENT OFFICE
CERTIFICATE OF CORRECTION

PATENT NO. : 4,387,408
DATED : June 7, 1983
INVENTOR(S) : Lewis B. Browder

It is certified that error appears in the above-identified patent and that said Letters Patent are hereby corrected as shown below:

Title, line 2, "RESISTANCE" should read --RESISTANT--.

Column 1, line 3 "RESISTANCE" should read --RESISTANT--.

*Signed and Sealed this*

*Sixteenth* Day of *August 1983*

[SEAL]

Attest:

GERALD J. MOSSINGHOFF

*Attesting Officer* *Commissioner of Patents and Trademarks*